(12) United States Patent
Singh et al.

(10) Patent No.: US 9,614,793 B1
(45) Date of Patent: Apr. 4, 2017

(54) SYSTEMS AND METHODS FOR DISTRIBUTING CONTENT WITH A PORTABLE ELECTRONIC DEVICE

(71) Applicants: Gurminder Singh, Cupertino, CA (US); Manoranjan D. Jesudoss, Singapore (SG)

(72) Inventors: Gurminder Singh, Cupertino, CA (US); Manoranjan D. Jesudoss, Singapore (SG)

(*) Notice: Subject to any disclaimer, the term of this patent is extended or adjusted under 35 U.S.C. 154(b) by 343 days.

(21) Appl. No.: 14/181,337

(22) Filed: Feb. 14, 2014

Related U.S. Application Data

(62) Division of application No. 12/616,692, filed on Nov. 11, 2009, now Pat. No. 8,655,404.

(51) Int. Cl.
| | |
|---|---|
| *H04M 1/00* | (2006.01) |
| *H04B 1/38* | (2015.01) |
| *H04L 12/58* | (2006.01) |
| *G06F 3/0484* | (2013.01) |
| *H04W 4/06* | (2009.01) |

(52) U.S. Cl.
CPC ........ *H04L 51/046* (2013.01); *G06F 3/04842* (2013.01); *H04W 4/06* (2013.01)

(58) Field of Classification Search
CPC .............. G06Q 50/01; H04M 1/72522; H04M 2250/52; H04M 1/00; H04B 1/38; H04N 1/00; H04N 1/32; H04N 5/232; H04W 4/08; H04W 8/186; H04W 28/06; G06F 15/16
See application file for complete search history.

(56) References Cited

U.S. PATENT DOCUMENTS

| | | | |
|---|---|---|---|
| 7,298,714 | B2 | 11/2007 | Foster |
| 7,298,833 | B2 | 11/2007 | Klein et al. |
| 7,315,747 | B2 | 1/2008 | Klassen et al. |
| 7,359,699 | B2 | 4/2008 | Rajaram |
| 7,362,745 | B1 | 4/2008 | Cope et al. |
| 7,526,310 | B2 | 4/2009 | Billmaier et al. |
| 8,150,807 | B2 | 4/2012 | Fredlund et al. |

(Continued)

OTHER PUBLICATIONS

"About Qik (pronounced "quick")", [online]. Qik, Inc. [retrieved on Jun. 10, 2008], <URL: http://qik.com/info/about_us>.

(Continued)

*Primary Examiner* — Pablo Tran
(74) *Attorney, Agent, or Firm* — Treyz Law Group, P.C.; Michael H. Lyons

(57) ABSTRACT

Systems and methods are provided for sharing and distributing content using a mobile client on a cellular telephone. The mobile client may transmit the shared content to a service portal and the service portal may distribute the shared content to client devices. The content may include images, audio, video, documents, and any other content a user desires to share using the cellular telephone. The mobile client may be configured to operate in a variety of sharing modes. In some of the sharing modes, the mobile client may perform certain functions automatically in response to the creation of new content. Each item of content may be shared and distributed to one or more social groups. Each social group may include one or more users. Each of the users in a social group may be associated with a client device and may be associated with another cellular telephone.

11 Claims, 11 Drawing Sheets

(56) References Cited

U.S. PATENT DOCUMENTS

| | | | |
|---|---|---|---|
| 8,219,703 B2 | 7/2012 | Sparre | |
| 8,224,178 B2* | 7/2012 | Keane | H04N 1/00244 348/14.02 |
| 8,331,861 B2 | 12/2012 | Flinchem | |
| 8,634,712 B1* | 1/2014 | Mullins | H04N 1/00214 348/14.02 |
| 2006/0001737 A1 | 1/2006 | Dawson et al. | |
| 2006/0242234 A1* | 10/2006 | Counts | H04W 4/08 709/204 |
| 2007/0276862 A1 | 11/2007 | Toutonghi | |
| 2011/0028083 A1 | 2/2011 | Soitis | |
| 2011/0183651 A1* | 7/2011 | Mundy | G06F 17/30265 455/414.1 |
| 2011/0218996 A1 | 9/2011 | Jin et al. | |
| 2012/0246267 A1 | 9/2012 | Mallet et al. | |
| 2014/0327936 A1* | 11/2014 | Busch | G06F 3/1292 358/1.15 |
| 2016/0132231 A1* | 5/2016 | Rathod | H04N 5/23245 715/719 |

OTHER PUBLICATIONS

"Frequently Asked Questions", [online]. Qik, Inc. [retrieved on Jun. 10, 2008], <URL: http://qik.com/info/faq>.
Singh, U.S. Appl. No. 61/058,871, filed Jun. 4, 2008.
Singh, U.S. Appl. No. 12/477,103, filed Jun. 2, 2009.
Singh, U.S. Appl. No. 61/074,866, filed Jun. 23, 2008.
Singh, U.S. Appl. No. 12/489,310, filed Jun. 22, 2009.
Singh, U.S. Appl. No. 61/091,690, filed Aug. 25, 2008.
Singh, U.S. Appl. No. 12/546,580, filed Aug. 24, 2009.

* cited by examiner

SYSTEMS AND METHODS FOR DISTRIBUTING CONTENT WITH A PORTABLE ELECTRONIC DEVICE

This application is a divisional of patent application Ser. No. 12/616,692, filed Nov. 11, 2009, which is hereby incorporated by referenced herein in its entirety. This application claims the benefit of and claims priority to patent application Ser. No. 12/616,692, filed Nov. 11, 2009.

BACKGROUND OF THE INVENTION

This invention relates generally to distributing content from portable electronic devices to other electronic devices.

Cellular telephones and other portable electronic devices are becoming increasingly powerful and typically have significant processing, memory, image capture, video capture, audio capture, wireless communication, and storage resources. These resources can be substantial enough to capture content such as audio, images, and video and to wirelessly transmit the content to other electronic devices such as cellular telephones, televisions, and personal computers. With conventional systems, the process for transmitting the content to other electronic devices is cumbersome and bandwidth inefficient.

It would therefore be desirable to be able to provide systems and methods for distributing content from portable electronic devices to other electronic devices.

SUMMARY OF THE INVENTION

Systems and methods are provided for sharing and distributing content from a portable electronic device to other electronic devices. The portable electronic device may, as one example, be a cellular telephone.

Users of cellular telephones may obtain (e.g., capture) content such as audio, images, video clips, streaming video, documents, files, and other types of content and may be able to share and distribute the content using a mobile client on the cellular telephone. The mobile client may be used in distributing the content to client devices. If desired, a user of a cellular telephone may share and distribute content to other users at the client devices by transmitting the content to a service portal. The service portal may then retransmit the content to the client devices. By utilizing the service portal, the user of the cellular telephone can send the content a single time to the service portal and the service portal can then transmit the content to selected client devices.

Users may form social groups that are used in the sharing and distributing of content. When content is shared by a user of a cellular telephone, a mobile client on the cellular telephone may receive a selection from the user of one or more social groups that should receive the content. The service portal may then distribute the shared content to the client devices associated with the users in the selected social groups.

A mobile client on a cellular telephone used in sharing content may be configured to operate in a variety of content sharing modes. As part of configuring the mobile client to operate in one of the content sharing modes, the mobile client may receive from a user a list of default social groups that content should be shared with.

In an automatic content sharing mode, the mobile client may automatically detect newly created content (e.g., as the content is created), may automatically associate the newly created content with the default social groups, and may automatically distribute the newly created content to the default social groups (e.g., by transmitting the content to a service portal and/or by transmitting the content directly to the users in the default social groups).

In a semi-automatic content sharing mode, the mobile client may automatically detect newly created content and may automatically prompt the user with an offer to share the content with the default social groups. If desired, the offer may include an option to share the content with the default social groups, an option to provide a modified list of social groups to share the content with, and an option to not share the content (e.g., to defer sharing the content or to cancel sharing of the content). Once the mobile client receives confirmation that the content is to be shared, the mobile client may distribute the content to the selected social groups.

In a manual content sharing mode, the mobile client may receive commands from a user selecting content for sharing. The mobile client may then receive instructions from the user to share the content with the default social groups or to share the content with another set of social groups. In response, the mobile client may distribute the selected content to the selected social groups (e.g., by transmitting the selected content to a service portal for forwarding to the appropriate client devices).

Further features of the invention, its nature and various advantages will be more apparent from the accompanying drawings and the following detailed description of the preferred embodiments.

DETAILED DESCRIPTION

Figure 1:
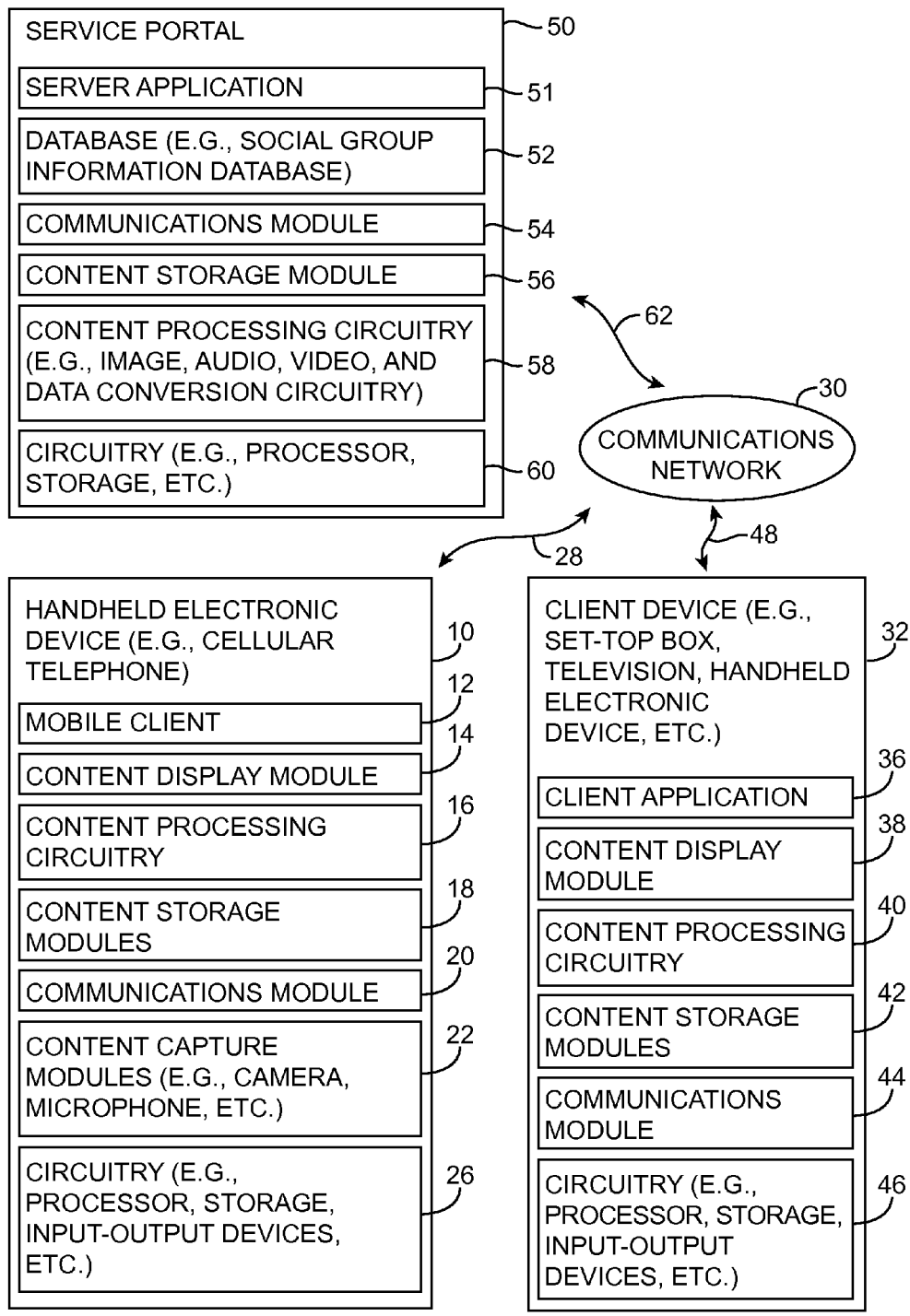
FIG. 1 is a diagram of an illustrative system in which portable electronic devices can share content with other electronic devices in accordance with an embodiment of the present invention.

This invention relates generally to distributing content from portable electronic devices to other electronic devices.

The portable electronic devices may be any suitable electronic device such as cellular telephones, cameras, portable media players, laptops, portable computers, and tablet computers. With one suitable arrangement, the portable electronic devices may maintain a wireless connection to a network such as the Internet. As another example, the portable electronic devices may be periodically connected to a network (e.g., by connecting the devices to a computer, by periodically activating a wired or wireless network connection, etc.). The portable electronic devices may generally be referred to herein as cellular telephones. However, the portable electronic devices that share content with other electronic devices may, in general, be any network-connected electronic devices.

The electronic devices that receive content from portable electronic devices may be any suitable electronic devices such as cellular telephones, portable media players, laptops, portable computers, tablet computers, desktop computers, servers, network-connected televisions, set-top boxes, digital video recorders, personal video recorders, etc. The electronic devices that receive content such as audio, images, and video from the portable electronic devices may sometimes be referred to herein as client devices.

The content shared between the electronic devices may include images, audio, video, text, and other suitable content that a user of a portable electronic device desires to share and distribute to other electronic devices. If desired, the shared content may include recorded content such as video and audio clips and may include streaming real-time content such as streaming video. When streaming real-time content such as streaming video, one or more frames may be cached on the cellular telephone (e.g., as a communications buffer). With one suitable arrangement, content may be created by and distributed from portable electronic devices such as cellular telephones. The cellular telephones may be used to capture or create content. For example, the cellular telephones may include cameras and microphones for capturing audio, images, and video. Users of the cellular telephones may be able to capture and share images of important events and then share and distribute the images to other electronic devices. As another example, users may be able to capture video of important events and send the video to other electronic devices.

If desired, users that share content and users that receive content may be grouped in any number of social groups. In general, each social group may include any desired number of users. Each social group may have one or more creators (i.e., administrators) responsible for authorizing changes to the composition of that social group (e.g., which users are a part of that social group). In addition, some social groups may be open so that any user can join, without requiring the approval of the creators of those social groups.

When a user of a cellular telephone desires to share content with other users and other electronic devices, the user may use a mobile client application to upload the content to a service portal along with an indication of which social groups the service portal is to distribute the content to. Uploading of the content may occur automatically, semi-automatically, or manually, as examples. With an automatic arrangement, newly created content (e.g., images that have just been captured by a camera), content in a pre-selected folder, or other suitable content can be automatically uploaded by the mobile client application to the service portal without requiring action by the user of the cellular telephone. With a semi-automatic arrangement, when content is captured or obtained by the cellular telephone, the mobile client application may automatically prompt the user of the cellular telephone to determine if the user desires to share and distribute that content. The automatic and semi-automatic uploading of content may occur on a continuous basis (e.g., as soon as content is obtained or created), on a periodic basis (e.g., at preset intervals of time), and at other suitable times (e.g., whenever the cellular telephone connects to a network, whenever the cellular telephone connects to a network designated as its "home network," etc.). With a manual arrangement, the user of the cellular telephone may use the mobile client application to select which content (e.g., which images, audio files, video files, text documents, etc.) is to be shared and distributed.

An illustrative cellular-telephone-based content distribution system is shown in FIG. 1. In the system of FIG. 1, cellular telephone devices such as device 10 may have a mobile client 12 that is used in sharing content. Device 10 and mobile client 12 may transmit shared content over a communications network 30 to one or more client devices 32.

Communications network 30 may include one or more networks such as the Internet, one or more cellular-telephone networks, local area networks, etc. Communications paths 28, 48, and 62 in network 30 may include any suitable wired and wireless communications paths such as wireless cellular-telephone communications paths, Internet protocol communications paths (e.g., for Internet protocol television), satellite communications paths, cable communications paths, radio-frequency communications paths, etc.

As shown in FIG. 1, device 10 may be a cellular telephone device or other handheld device. Device 10 may have circuitry 26 such as processing circuitry, storage, and input-output devices.

Storage in device 10 may include one or more different types of storage such as hard disk drive storage, nonvolatile memory (e.g., flash memory or other electrically-programmable-read-only memory), volatile memory (e.g., battery-powered static or dynamic random-access-memory), etc.

Processing circuitry in device 10 may be based on a processor such as a microprocessor, digital signal processor, microcontroller, application specific integrated circuits, and other suitable integrated circuits. Processing circuitry and storage in device 10 may used to run software on device 10 such as mobile client 12 and other software components. Processing circuitry and storage in device 10 may be used in implementing suitable communications protocols such as internet protocols, wireless local area network protocols (e.g., IEEE 802.11 protocols), cellular telephone communications protocols for data and voice, etc.

Circuitry 26 may include input-output devices that allow data to be provided to device 10 from external devices and that allow data to be supplied from device 10 to external devices and to users of device 10. Input-output devices can include user input-output devices such as displays, cameras, position sensors, buttons, touch pads, key pads, keyboards, microphones, various sensors, etc. Circuitry 26 may include circuitry for handling content such as images, audio, and video. A user can control the operation of device 10 by supplying commands through input-output devices. A user may use input-output devices to load media content onto device 10 (e.g., by taking pictures using an integrated camera, by capturing an audio track using an integrated microphone, by capturing video and video clips with the camera and microphone, etc.).

Circuitry 26 may also include wireless communications systems such as radio-frequency (RF) transceiver circuitry formed from one or more integrated circuits, antennas, and other circuitry for handling RF wireless signals. With one suitable arrangement, device 10 may have one or more radio-frequency transceivers that allow device 10 to wirelessly transmit images over a wireless communications path 28.

Mobile client 12 may include hardware and software components. The software components may be implemented using software that is stored in storage in device 10 and run on a processor in device 10.

Content display module 14 may include hardware and software for displaying content for a user of device 10. For example, content display module 14 may display content that is to be shared with client devices 32.

Content processing circuitry 16 may be used to prepare content to be shared with client devices 32. For example, content processing circuitry 16 may include image, audio, and video processing circuitry that manipulates content before the content is transmitted from device 10 over network 30 to service portal 50 or client devices 32. Content processing circuitry 16 may be able to adjust the amount of compression that is used based on the amount of available bandwidth through communications path 28. For example, when device 10 is connected to a relatively slow cellular data connection, content processing circuitry 16 may increase the compression of content being transmitted over path 28. When device 10 is connected to a relatively fast cellular data connection or another fast data connection such as a Wi-Fi® data connection, content processing circuitry 16 may decrease the amount of compression applied to the shared content (e.g., so that the quality of content such as audio, images, and video is maximized).

Content storage modules 18 may store content in a format suitable for sharing over communications path 28. As one example, content storage modules 18 may be used to store content when transmission pat 28 is temporarily unavailable (e.g., when device 10 is not connected to network 30) so that the content can be transmitted later (e.g., when device 10 is connected to network 30). Content storage modules 18 may store social group information such as lists of social groups device 10 is associated with and the contact information of users in the social groups.

Communications module 20 may include software and hardware associated with sharing (e.g., transmitting) content over communications path 28. For example, communications module 24 may control the operation of one or more radio-frequency transceivers that transmit and receive data signals over communications path 28.

Content capture modules 22 may include hardware and software in device 10. For example, content capture modules 22 may include a camera, microphone, and other sensors associated with device 10. Content capture modules 22 may also include software for interacting with the hardware components. With one suitable arrangement, mobile client 12 may directly control the content capture modules 22 (e.g., mobile client 12 may directly control a camera in device 10). With another suitable arrangement, software other than mobile client 12 may control content capture modules 22 and mobile client 12 may merely access content already captured by the content capture modules 22 and stored in content storage modules 18.

The system of FIG. 1 may include one or more client devices 32. Client device 32 may be formed using any suitable electronic device. Each client device 32 may have circuitry 46 that includes processing circuitry, storage, and input-output devices.

Storage in device 32 may include one or more different types of storage such as hard disk drive storage, nonvolatile memory (e.g., flash memory or other electrically-programmable-read-only memory), volatile memory (e.g., battery-powered static or dynamic random-access-memory), etc.

Processing circuitry in device 32 may be based on a processor such as a microprocessor and other suitable integrated circuits. With one suitable arrangement, processing circuitry and storage in device 32 are used to run software on device 32 such as client application 36 and other software components. Processing circuitry and storage in device 32 may be used in implementing suitable communications protocols such as Internet protocols and wireless local area network protocols (e.g., IEEE 802.11 protocols).

Circuitry 46 may include input-output devices that allow data to be provided to device 32 from external devices and that allow data to be supplied from device 32 to external devices. Input-output devices can include user input-output devices such as infrared or radio-frequency remote controls, buttons, touch pads, key pads, keyboards, etc. A user can control the operation of device 32 by supplying commands through input-output devices such as remote controls.

Circuitry 46 may include wired communications systems that are connected to communications network 30 through a communications path 48. If desired, circuitry 46 may also include wireless communications systems for connecting to network 30.

Client application 36 may be implemented using software that is stored in storage in device 32 and run on a processor in device 32. Client application 36 may be used in managing the operations of client device 32.

Content display module 38 may receive data associated with shared content received directly or indirectly from device 10 such as data received through communications module 44. Content display module 38 may display the shared content on a display associated with device 32.

Content processing circuitry 40 may be used to manipulate content that is received from device 10 or from service portal 50. Content processing circuitry 40 may be used in performing image, audio, and video transcoding operations, as examples.

Optional content storage module 42 may store content that is received from electronic devices such as device 10 for later use. In this type of arrangement, client devices 32 may be electronic devices that have storage such as a hard-disk drive. Client devices 32 may also be devices which have removable storage drives sometimes referred to as memory cards readers (e.g., the client devices 32 may store data associated with shared content on removable memory cards). Content storage module 42 may store store social group information such as lists of social groups device 32 is associated with and the contact information of users in the social groups.

Communications module 44 may be used in receiving shared images over communications path 48. Communications module 44 may also be used to receive and send data associated with notifications of the shared images.

Service portal 50 may be used to coordinate the delivery and distribution of content from device 10 to one or more client devices 32. For example, device 10 may transmit content directly to service portal 50 which, in turn, may retransmit the content to the appropriate client devices 32 (e.g., the client devices 32 associated with the social groups with which the user of device 10 has shared the content). Arrangements in which device 10 transmits content to service portal 50 rather than directly to client devices 32 may reduce the amount of data transmitted over communications path 28, which may be desirable when communications path 28 is limited. If desired, device 10 may transmit content directly to appropriate client devices 32 in addition to or in lieu of transmitting images directly to service portal 50. With one suitable arrangement, service portal 50 may be implemented as a server connected to communications network 30 over a communications path 62.

Server application 51 may be implemented using software that is stored in storage in service portal 50 and run on a processor in service portal 50. Server application 51 may be used in managing the operations of service portal 50.

Circuitry 60 in service portal 50 may include any suitable circuitry such as processor circuitry, storage circuitry, wired and wireless communications circuitry, etc.

Service portal 50 may include a database 52. Database 52 may include a social group database. The social group database may include information such as lists of users that are in each social group channel, the contact information of users, and registration information of users.

Service portal 50 may include communications module 54. Communications module 54 and other software-based components in portal 50 may run on hardware such as content processing circuitry 58 and circuitry 60. Module 54 may receive content from device 10 and then transmit the content to client devices 32 (e.g., televisions). Communications module 54 may also be used to receive and transmit data associated with notifications of shared content (e.g., sending notifications to client devices 32 of newly shared content).

Service portal 50 may include content storage module 56. Content storage module 56 may be used to record shared content for later distribution to electronic devices such as devices 32, as one example.

Content processing circuitry 58 may be used to manipulate shared content such as images, audio, and video that is received from cellular-telephone device 10 before the content is transmitted to client devices 32. For example, content processing circuitry 58 may be used in performing image, audio, and video transcoding operations. The content may be transcoded into one or more formats that are optimized for specific types of client devices 32. For example, image and video processing circuitry 58 may take images and video from device 10 and generate images and videos that are each optimized for a different type of display (e.g., optimized for different display formats, resolutions, etc.).

Figure 2:
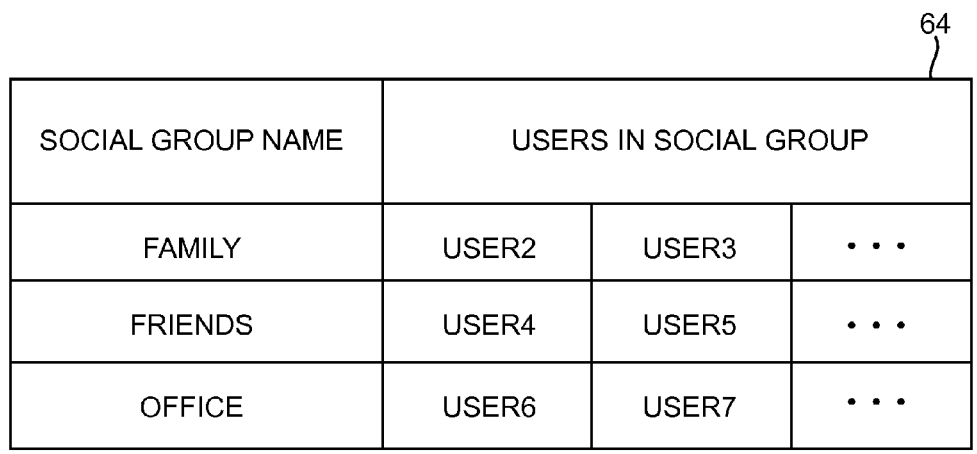
FIG. 2 is an illustrative representation of a social group database that may be used in a system of the type shown in FIG. 1 in accordance with an embodiment of the present invention.

An example of data 64 that may be contained in database 52 and other databases is shown in FIG. 2. If desired, the data of FIG. 2 may be stored at service portal 50, cellular telephone devices such as device 10 (e.g., in storage modules 18), and client devices 32 (e.g., in storage modules 42). With one suitable arrangement, each cellular telephone device 10 and client device 32 may have a database containing data associated with that device (e.g., a database with information on the social groups associated with that device) and service portal 50 may have a complete database containing data associated with all of the users.

The illustrative data shown in FIG. 2 includes a listing of social groups and a listing of users in each of the social groups. If desired, data 64 may also include information associated with each user such as the user's name, phone number, mailing address, billing address, list of social groups the user is a part of, a listing of Internet-protocol addresses for devices 10 and client device 32 associated with the user, one or more e-mail addresses, an instant messaging address, login information such as a username and password used to log into (e.g., to authenticate the user to) service portal 50, and any other desired information. If the users have a cellular telephone, their cellular telephone number may be a part of data 64.

Figure 3:
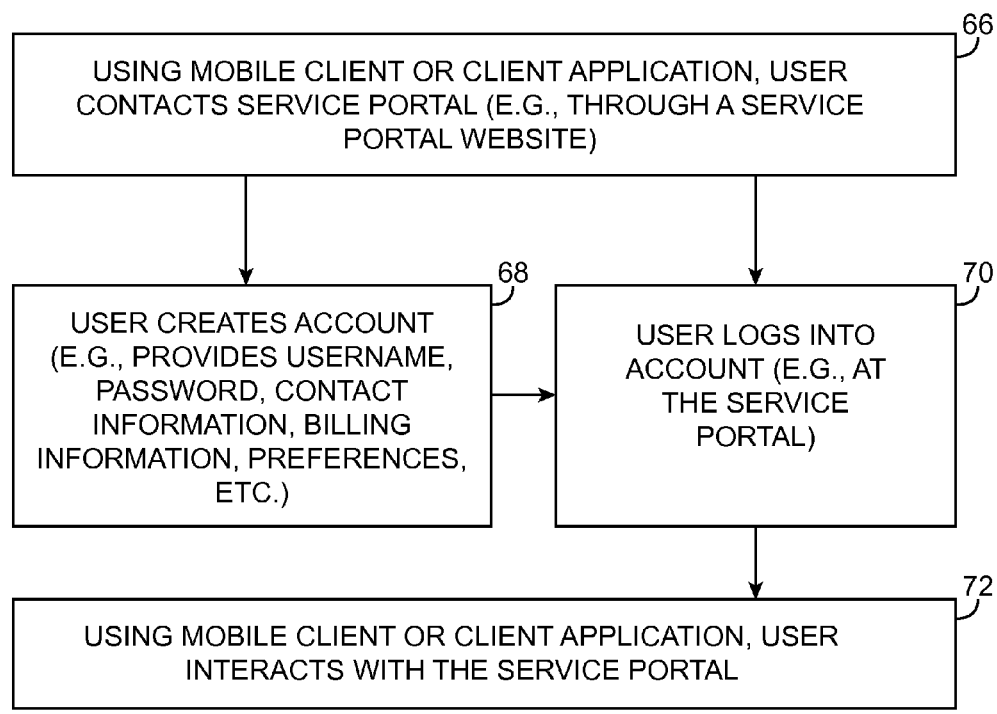
FIG. 3 is a flow chart of illustrative steps involved in using a mobile client or client application to connect to and interact with a server application in accordance with an embodiment of the present invention.

Illustrative steps involved in using mobile client 12 and client application 32 to connect to and interact with server application 51 on service portal 50 are shown in FIG. 3.

At step 66, a user may contact service portal 50. The user may contact service portal 50 using mobile client 12 or client application 36 to connect to the portal's website using a web browser, as an example. In general, the user may contact service portal 50 using any suitable type of electronic device such as a cellular telephone device such as device 10, a personal computer, a client device 32 such as a television or a set-top box connected to a television, a handheld electronic device, etc. With one suitable arrangement, the user may contact service portal 50 using a web browser in device 10.

Users of the cellular-telephone-based content distribution service may have accounts with service portal 50. At step 68, the user may create an account. The user may create their account by providing account information such as a username, password, contact information such as their cellular-telephone number, identification information for their mobile devices 10 and client devices 32 (e.g., device IDs such as an IP address or other suitable identification information), preferences, billing information, etc. The user may provide account information to service portal 50 using a web browser or using short message service SMS messages, as examples, (e.g., using device 10, a client device 32, or another suitable electronic device). Once a user has an account, the user may log into their account at service portal 50 in step 70 (e.g., by providing their username and password at the service portal's website).

In step 72, the user may use mobile client 12 or client application 36 to interact with service portal 50.

Figure 4:
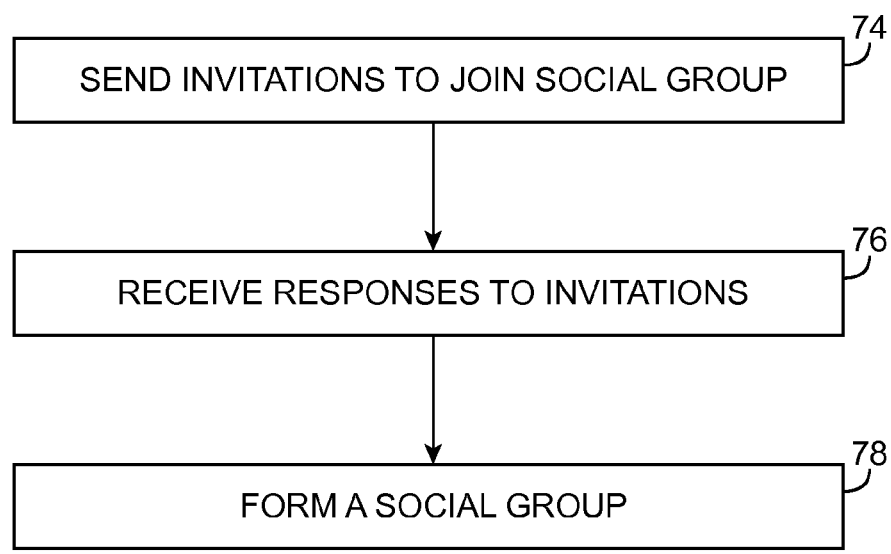
FIGS. 4 and 5 are flow charts of illustrative steps involved in forming social groups in accordance with an embodiment of the present invention.
Figure 5:
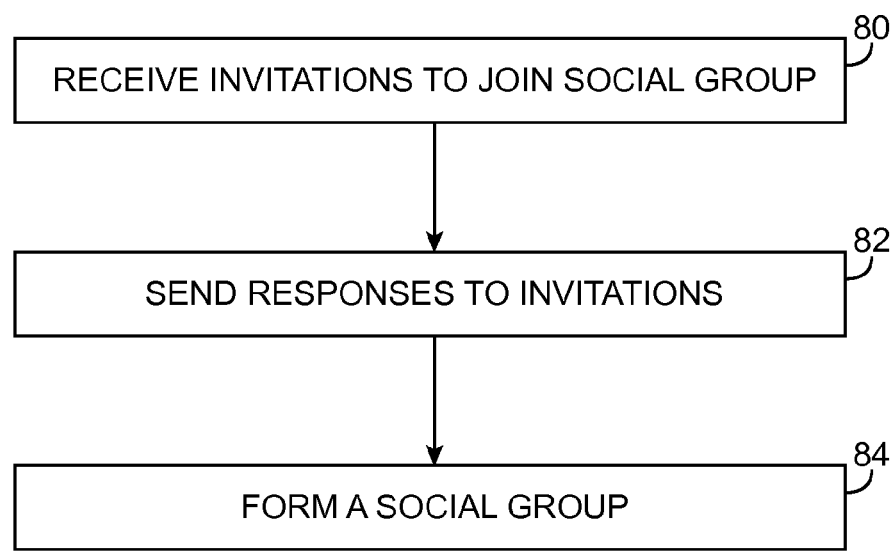

A user may create a social group by providing service portal 50 with a social group name and a list of users. If desired, providing service portal 50 with the social group name and list of users may be sufficient to create a social group and begin sharing and distributing content within the social group (e.g., having one or more devices 10 in the social group share content in the system of FIG. 1). With another suitable arrangement, when creating or modifying social groups, service portal 50 may send invitations to users that are being added to a social group. With this type of arrangements, users can provide an affirmative response before being added to a social group. FIGS. 4 and 5 show an example of steps involved in forming social groups in a system where invitations and responses to invitations are exchanged when modifying or creating a social group.

As shown in FIG. 4, a user may send invitations to other users to join a social group in step 74. If desired, the invitations may be sent by server application 51, by mobile client 12, or by client application 36. Each invitation may include any desired information such as a sampling of shared content, all current shared content, a list of users already in the social group, a list of users whose membership is pending (e.g., users that have not yet responded to invitations to join the social group), information associated with the user sending the invitation, etc.

In step 76, the user may receive a response to the invitations. The response may be an acceptance, a rejection, or a deferral, as examples. If desired, the response may include a note or other information.

In step 78, a social group may be formed or modified. For example, server application 51, mobile client 12, and client application 36 may update their records of social groups to reflect changes effected by the responses received in step 76.

FIG. 5 illustrates the steps involved in receiving and responding to invitations to join a social group. In step 80, a user at a device 10 or client device 32 may receive an invitation to join a social group. In step 82, the user may send a response (i.e., rejecting, accepting, or deferring the invitation) using mobile client 12 or client application 36 as examples. In step 84, the social group may be formed or modified.

Figure 6:
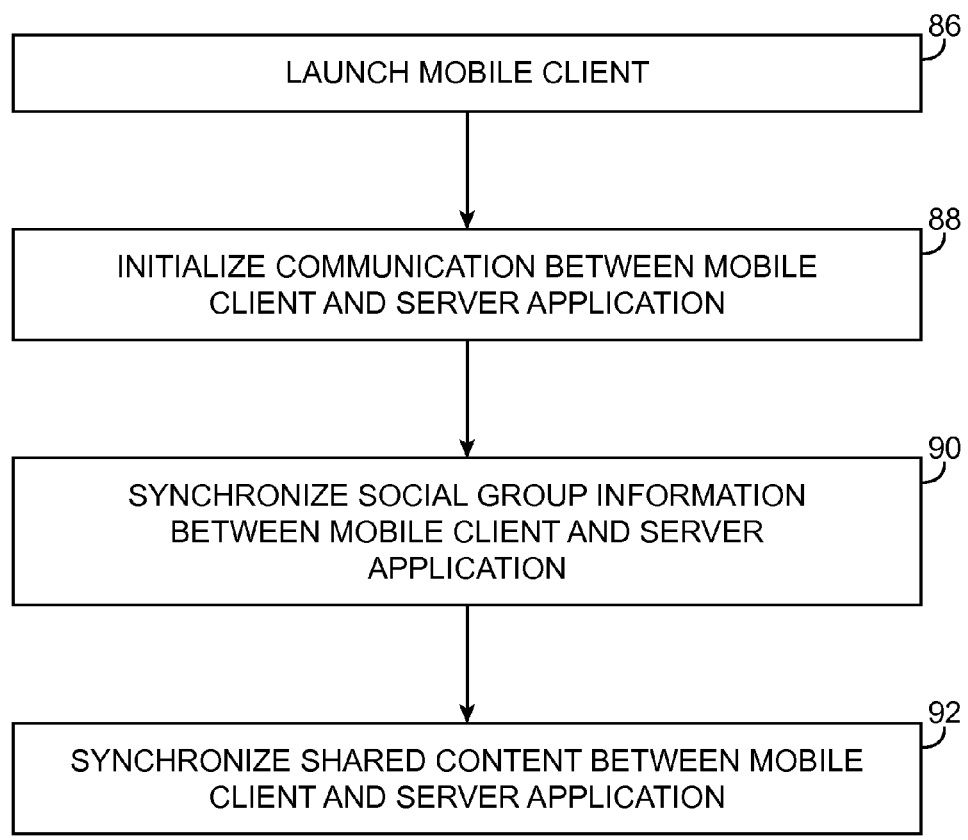
FIG. 6 is a flow chart of illustrative steps involved in synchronizing information between a mobile client on a portable electronic device and a server application in accordance with an embodiment of the present invention.

A user of device 10 may use mobile client 12 to communicate with service portal 50 and server application 51 and to synchronize information between server application 51 and mobile client 12. FIG. 6 shows illustrative steps involved in the synchronization of data between server application 51 and mobile client 12.

In step 86, a user may launch mobile client 12. For example, a user may initialize mobile client 12 (i.e., software running on circuitry 26 of device 10) or a user may open an already-running instantiation of mobile client 12. If desired, mobile client 12 may run continuously as a background process when the user is not interacting with mobile client 12.

In step 88, mobile client 12 may initialize communications with server application 51. For example, mobile client 12 may connect to server application 51 over network 30 and transmit username and password information to server application 51. If desired, the username and password information may be cached on device 10 (e.g., the user's username and password may be saved for the convenience of the user).

In step 90, social group information stored by server application 51 in database 52 may be synchronized with any social group information stored on device 10. For example, if the user of device 10 has created or modified social groups with mobile client 12 since the last time mobile client 12 connected to server application 51, information on the new social groups and modified social groups may be transmitted to server application 51. As another example, server application 51 may transmit information to mobile client 12 such as invitations to join social groups and responses to invitations to join social groups.

In step 92, shared content stored by server application 51 in content storage module 56 may be synchronized with shared content stored by mobile client 12 in the content storage modules 18 of device 10. For example, if the user of device 10 has added new shared content, the newly shared content and a list of social groups the content is to be shared with may be transmitted to service portal 50. If the user of device 10 has modified which social groups have access to shared content, modified lists of which social groups have access to each item of shared content may be sent to service portal 50. If there is newly shared content from other devices 10 in content storage module 56 of service portal 50 that has not yet been received by the mobile client 12, the newly shared content may be transmitted to device 10. These are merely illustrative examples of actions that may occur in step 92.

Figure 7:
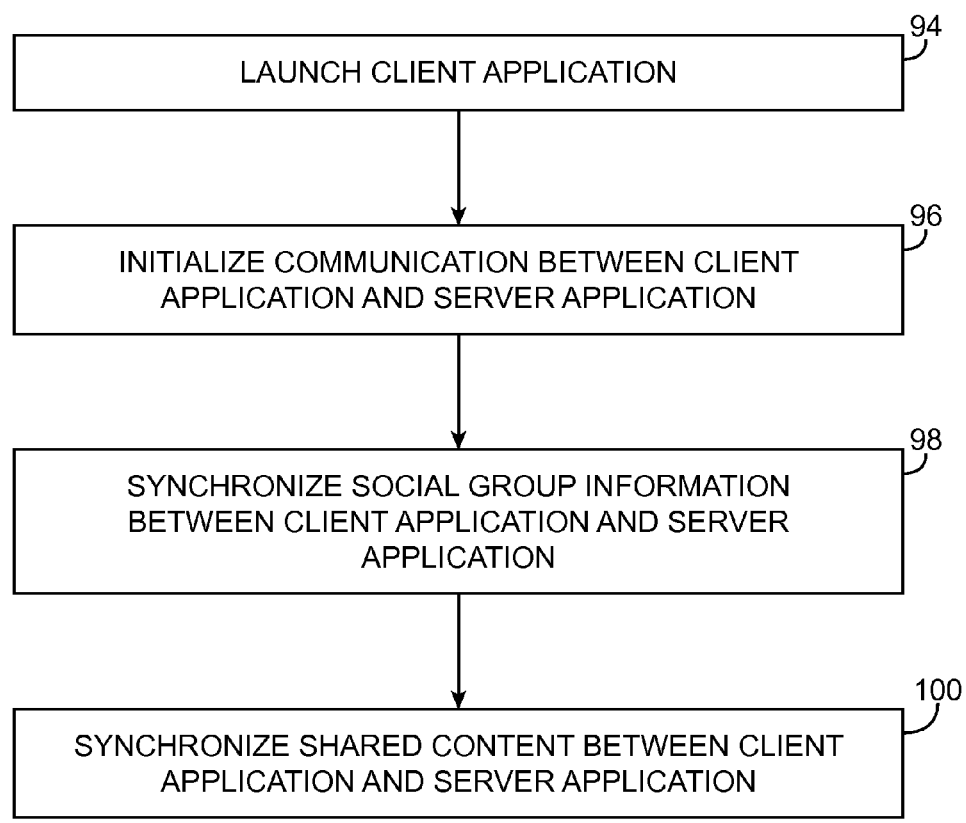
FIG. 7 is a flow chart of illustrative steps involved in synchronizing information between a client application on an electronic device and a server application in accordance with an embodiment of the present invention.

A user of a client device 32 may use client application 36 to communicate with service portal 50 and server application 51 and to synchronize information between server application 51 and client application 36 (e.g., with client device 32). FIG. 7 shows illustrative steps involved in the synchronization of data between server application 51 and client application 36.

In step 94, a user may launch client application 36. For example, a user may initialize a new instantiation of client application 36 (i.e., software running on circuitry 46 of device 32) or a user may open an already-running instantiation of client application 36 (e.g., when client application 36 runs as a background process).

In step 96, client application 36 may initialize communications with server application 51. For example, client application 36 may connect to server application 51 over network 30 and transmit username and password information to server application 51.

In step 98, social group information stored by server application 51 in database 52 may be synchronized with any social group information stored on client device 32. For example, if the user of device 32 has created or modified social groups with client application 36 since the last time client application 36 connected to server application 51, information on the new social groups and modified social groups may be transmitted to server application 51. As another example, server application 51 may transmit information to client application 36 such as invitations to join social groups and responses to invitations to join social groups.

In step 100, shared content stored by server application 51 in content storage module 56 may be synchronized with shared content stored by client application 36 (e.g., shared content stored in the content storage modules 42 of device 32). For example, if the user of device 10 has added shared content for the user of device 32, the newly shared content may be transmitted to client device 32 (e.g., client device 32 may download shared content from service portal 50). If the user of device 10 has removed content or no longer allows the user of client device 32 access to the shared content, some or all of the shared content in storage modules 42 may be deleted. These are merely illustrative examples of actions that may occur in step 100.

When a user wants to share content from a device 10 to one or more client devices 32, the user may use device 10 to obtain content, send the content to service portal 50, and have service portal 50 distribute the content to the client devices 32. With this type of arrangement, device 10 only has to transmit the content over communications path 28 a single time. A flow chart of illustrative steps involved in sharing and distributing content in this way is shown in FIG. 8.

Figure 8:
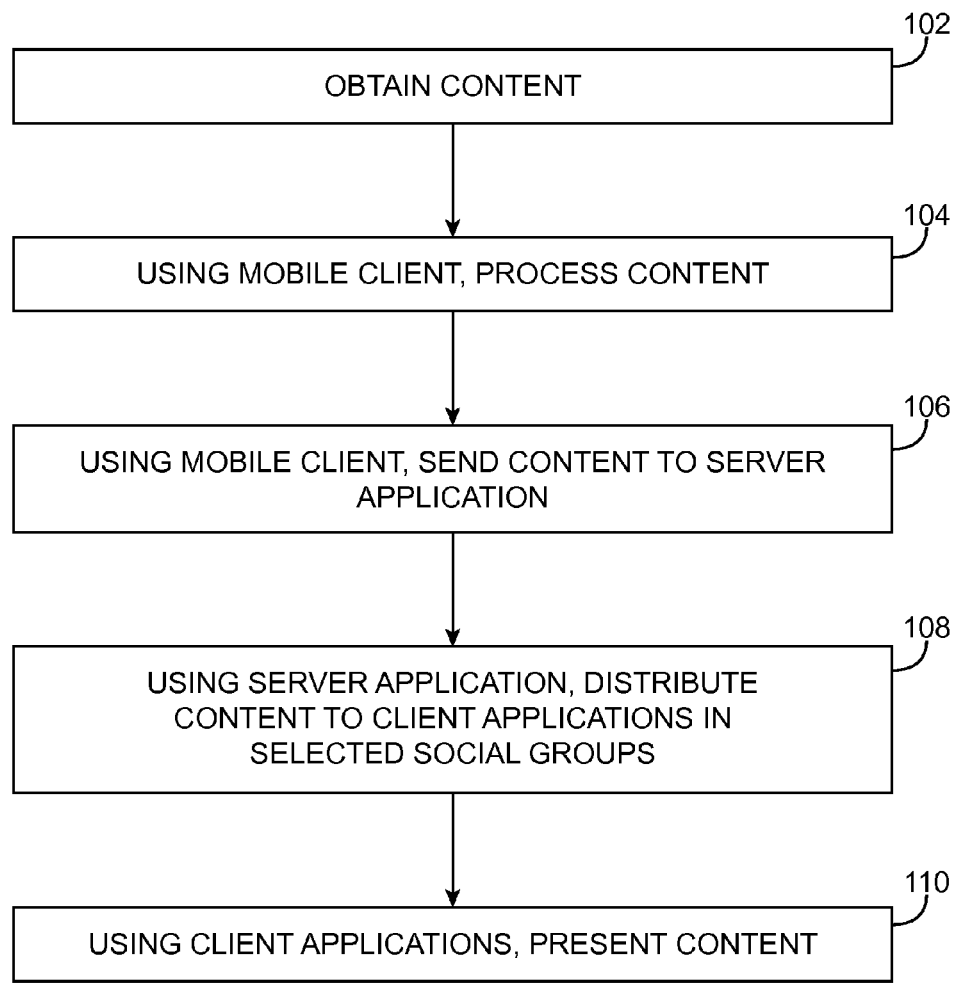
FIG. 8 is a flow chart of illustrative steps involved in sharing and distributing content from portable electronic devices to other electronic devices in a system of the type shown in FIG. 1 in accordance with an embodiment of the present invention.

As shown in FIG. 8, a user may obtain content in step 102. As a first example, mobile client 12 may be used to obtain content from content storage modules (e.g., content that has already been created or received by device 10). If desired, previously-created content in content storage modules 18 may be created by software running on circuitry 26 and utilizing content capture modules 22 (e.g., a camera program running on circuitry 26 that captures an image using a camera in the modules 22). As a second example, mobile client 12 may use content capture modules 22 to obtain content (e.g., mobile client 12 may use a camera and microphone to capture streaming video, video clips, images, streaming audio, audio clips, etc.).

In step 104, mobile client 12 may process the content obtained in step 102. For example, mobile client 12 may associate the content with a list of social groups and users that the content should be shared with. If desired, mobile client 12 may perform content processing on the obtained content (e.g., with content processing circuitry 16) as part of step 104.

In step 106, mobile client 12 may upload the content to server application 51 (e.g., for storage in module 56 and distribution to client devices 32). The content may be transmitted from device 10 to service portal 50 over communications paths 28 and 62, as one example.

In step 108, server application 51 may distribute the content obtained in step 102 to client applications 36 on the appropriate client devices 32. For example, server application 51 may distribute the content to the client applications 36 associated with users that mobile client 12 indicated the content should be shared with (e.g., the users and social groups indicated in step 104). If desired, a notification of available content may initially be sent to the client applications 36. With this type of arrangement, the client applications 36 can receive instructions from the user of the applications 36 as to which content the users want to receive and then retrieve only the selected content.

In step 110, client applications 36 may display the content distributed from the service portal 50 in step 108.

Mobile client 12 may have a number of different operating modes. In each operating mode, mobile client 12 may handle the steps of obtaining content, processing the content, and sending the content to service portal 50 in a different manner. For example, mobile client 12 may operate in an automatic mode where newly obtained content is automatically processed and sent to service portal 50. As another example, mobile client 12 may operate in a semi-automatic mode where mobile client 12 automatically prompts the user of client 12 when content is created to determine if the user wants to share the content. If desired, mobile client may operate in a manual mode in which a user may use mobile client 12 to manually obtain content (e.g. retrieve content from storage or create new content) and then process and transmit the content after receiving selections from the user of which content to share and distribute and which social groups to share the content with.

If desired, mobile client 12 may be configured by a user to operate in a particular one of the operating modes. Mobile client 12 may receive from the user of a default list of users and social groups that content should be shared with. Mobile client 12 may be configured to operate in a particular one of the operating modes (e.g., the automatic and semi-automatic modes) for a period of time (or while device 10 is physically present within a preset area as determined my location sensors in device 10 such as a global positioning satellite system). After the period of time elapses (of the device leaves the preset area), mobile client 12 may revert to another operating mode (e.g., the manual mode) or may shut down.

Figure 9:
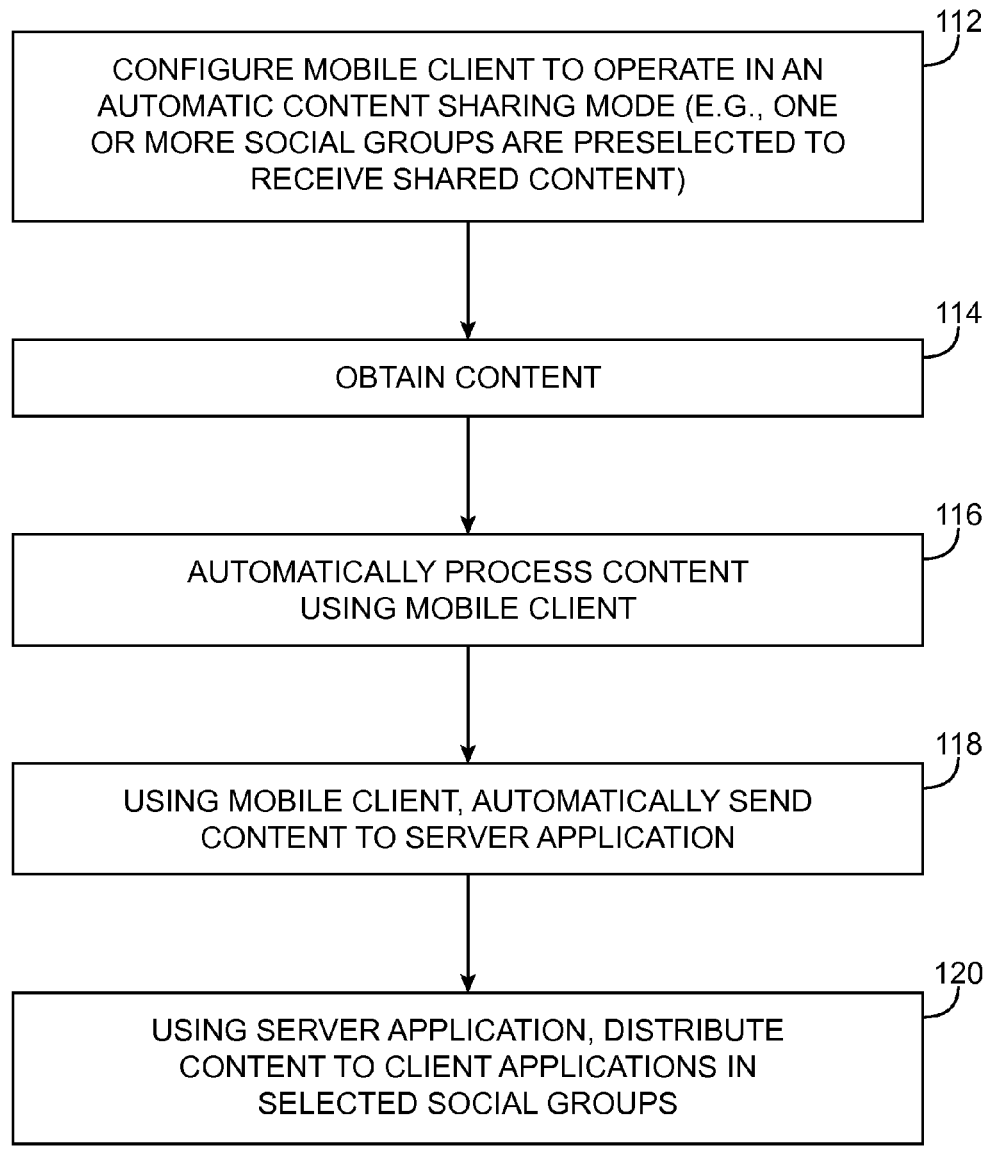
FIG. 9 is a flow chart of illustrative steps involved in sharing and distributing content with a mobile client operating in an automatic content sharing mode in accordance with an embodiment of the present invention.
Figure 10:
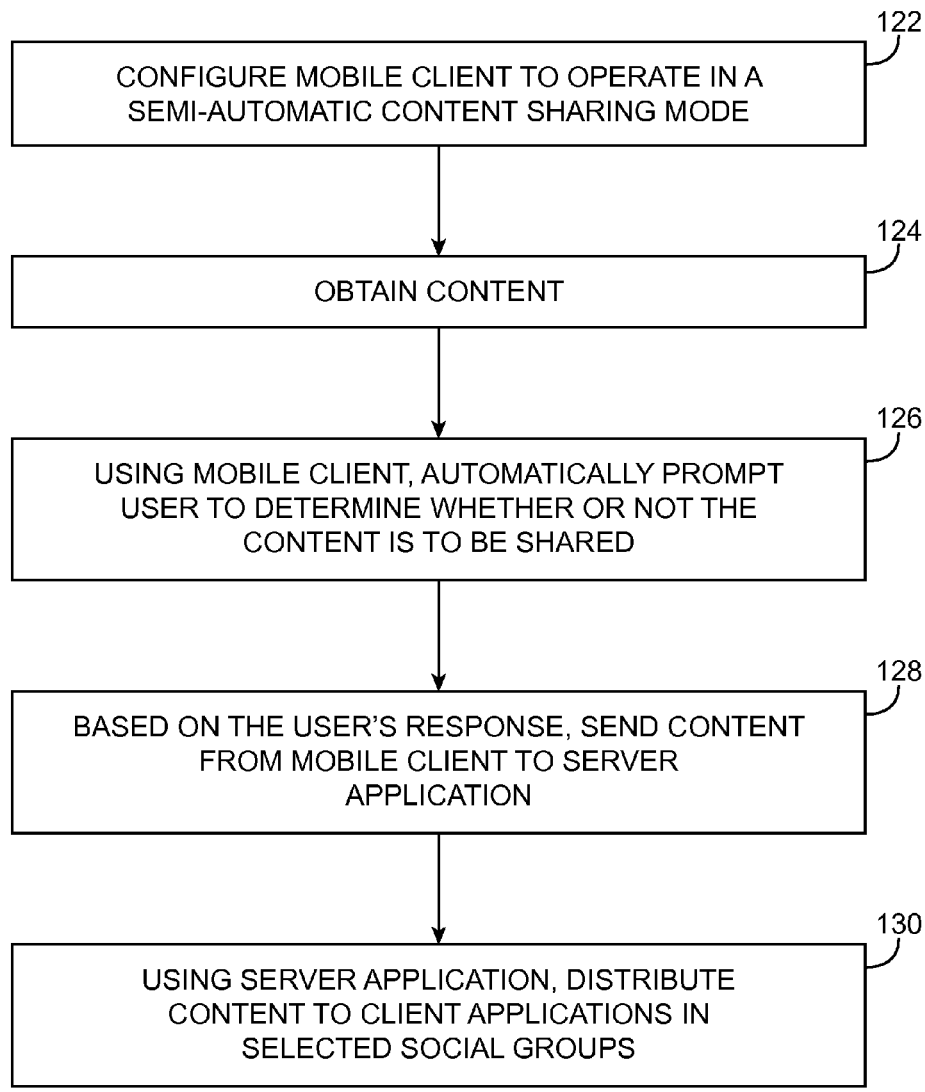
FIG. 10 is a flow chart of illustrative steps involved in sharing and distributing content with a mobile client operating in a semi-automatic content sharing mode in accordance with an embodiment of the present invention.
Figure 11:
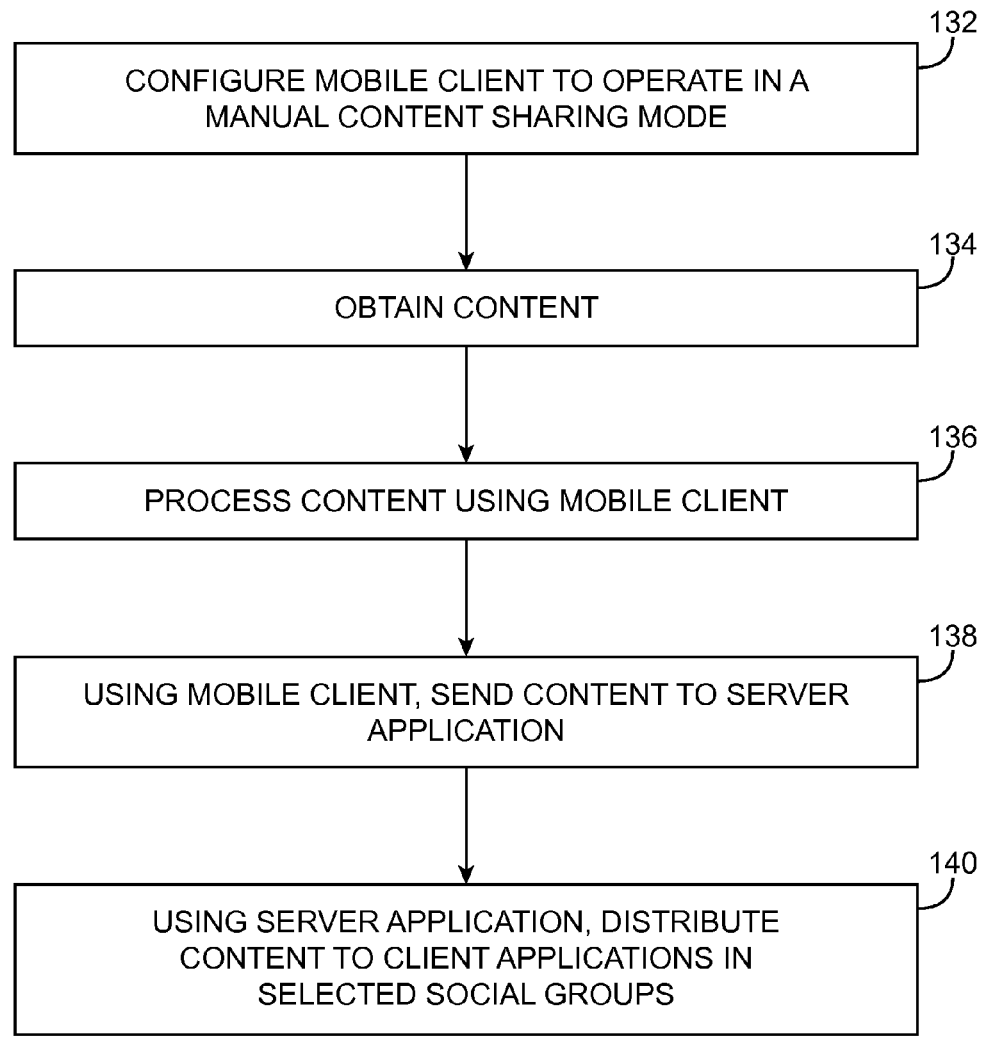
FIG. 11 is a flow chart of illustrative steps involved in sharing and distributing content with a mobile client operating in a manual content sharing mode in accordance with an embodiment of the present invention.

Flow charts of illustrative steps involved in sharing and distributing contents with mobile client 12 are shown in FIGS. 9, 10, and 11. FIG. 9 illustrates the steps involved in sharing and distributing content in an automatic content sharing mode.

In step 112, mobile client 12 may be configured to operate in an automatic content sharing mode. For example, mobile client 12 may receive from a user a list of social groups and users that are pre-selected to receive new content. With one suitable arrangement, mobile client 12 may be maintained as a background process when mobile client 12 is operating in the automatic content sharing mode.

In step 114, mobile client 12 may obtain content. For example, mobile client 12 may automatically detect new content in content storage modules 18 (e.g., when the new content is created by a content capture module 22 or received over communications path 28).

In step 116, mobile client 12 may automatically process the content obtained in step 114. For example, mobile client 12 may automatically associate the content with the pre-selected list of users and social groups provided in step 112.

In step 118, mobile client 12 may automatically transmit the content obtained in step 114 to server application 51 over network 30.

In step 120, serer application 51 may distribute the content to the appropriate client devices 32 (e.g., the client devices associated with users in the pre-selected list of social groups and users received in step 112).

With the arrangement of FIG. 9, device 10 may be used by a user to create and capture content and the content can be automatically shared and distributed to users of client devices 32 without intervention by the user of device 10. If desired, the automatic content sharing mode may be used when the user of device 10 desires to capture and share content (i.e., images, video, streaming video, audio, etc.) of a particular event in real-time (e.g., as the event occurs).

FIG. 10 illustrates the steps involved in sharing and distributing content in a semi-automatic content sharing mode.

In step 122, mobile client 12 may be configured to operate in the semi-automatic content sharing mode. For example, mobile client 12 may receive from a user a list of social groups and users that are pre-selected to receive new content. With one suitable arrangement, mobile client 12 may be maintained as a background process when mobile client 12 is operating in the semi-automatic content sharing mode.

In step 124, mobile client 12 may obtain content. For example, mobile client 12 may automatically detect new content in content storage modules 18 (e.g., when the new content is created by a content capture module 22 or received over communications path 28).

In step 126, mobile client 12 may automatically prompt the user of device 10 to determine if the user wants to share the content obtained in step 124. For example, mobile client 12 may automatically prompt the user to confirm that the content should be shared with the pre-selected list of users and social groups provided in step 122. If desired, mobile client 12 may provide the user with an opportunity to modify the list of pre-selected users and social groups of step 122 (e.g., to provide a new list of users and social groups). With one suitable arrangement, mobile client 12 may prompt the user by displaying a prompt with on-screen selectable options such as an option to share the content with the default social groups and users selected in step 122, an option to modify the default social groups and users (e.g., and then share the content with the modified selection of social groups and users), and an option to not share the content.

In step 128, mobile client 12 may transmit the content obtained in step 124 to server application 51 over network 30.

In step 130, serer application 51 may distribute the content to the appropriate client devices 32.

With the arrangement of FIG. 10, device 10 may be used by a user to create and capture content and the user can be automatically prompted to determine whether or not to share and distribute the content to users of client devices 32. If desired, the semi-automatic content sharing mode may be used when the user of device 10 desires to capture and share content (i.e., images, video, streaming video, audio, etc.) of a particular event in real-time (e.g., as the event occurs and with minimal intervention by the user of device 10).

FIG. 11 illustrates the steps involved in sharing and distributing content in a manual content sharing mode.

In step 132, mobile client 12 may be configured to operate in the manual content sharing mode. With one suitable arrangement, mobile client 12 may simply be turned off when configured to operate in the manual content sharing mode. With another suitable arrangement, mobile client 12 may continue to operate (e.g., as a background process) when configured to operate in the manual content sharing mode.

In step 134, mobile client 12 may obtain content. For example, mobile client 12 may be opened by a user. Using mobile client 12, a user may select one or more items for sharing. If desired, mobile client 12 may be used to select content from content storage modules 18 and may be used to capture content using content capture modules 22.

In step 136, mobile client 12 may process the content obtained in step 134. For example, mobile client 12 may associate the content obtained in step 134 with social groups (e.g., lists of users) that the content should be shared with. If desired, mobile client 12 may provide the user with an opportunity to associate the content with default (i.e., preselected) social groups. Mobile client 12 may provide the user with an opportunity to provide a list of one or more social groups that the content should be shared with. As another example, mobile client 12 may provide an opportunity for the user to supply a list of users and mobile client 12 may then create a social group out of those users and share the content with those users.

In step 138, mobile client 12 may transmit the content obtained in step 134 to server application 51 over network 30.

In step 140, serer application 51 may distribute the content to the appropriate client devices 32.

With the arrangement of FIG. 11, device 10 may provide the user of device 10 with a manual means of selecting which content in content storage modules 18 and which content obtained using content capture modules 22 is shared with selected users of client devices 32.

Information such as social group information and shared content may be stored on device 10. With this type of arrangement, steps 100, 106, 118, 128, and 138 of FIGS. 7, 8, 9, 10, and 11 may include storing content in content storage modules 18 at least until the content can be transmitted to service portal 50. For example, whenever device 10 is not connected to network 30 over a communications path 28, transmitting shared content from device 10 to service portal 50 may not be possible. With this arrangement, shared content can be cached on device 10 at least until communications path 28 is restored. Once communications path 28 is restored, device 10 may transmit the cached content to service portal 50 and service portal 50 may distribute the shared content to the selected client devices 32.

The foregoing is merely illustrative of the principles of this invention and various modifications can be made by those skilled in the art without departing from the scope and spirit of the invention.

What is claimed is:

1. A method of using a cellular telephone with an integrated camera and a mobile client that is configured to operate in a semi-automatic content sharing mode to distribute content to users at client devices over a communications network, wherein the users are organized in social groups, the method comprising:
receiving with the cellular telephone user input indicating a selection of a given social group;
while the mobile client is operating in the semi-automatic content sharing mode, capturing the content using the integrated camera, wherein capturing the content comprises storing at least one image in storage in the cellular telephone; and
while the mobile client is operating in the semi-automatic content sharing mode and in response to capturing the content using the integrated camera, automatically displaying on the cellular telephone an on-screen selectable option to transmit the content over the communications network to the client devices of the users in the default social group that was selected.

2. The method defined in claim 1 further comprising:
while automatically displaying the on-screen selectable option to transmit the content to the client devices, automatically displaying an on-screen selectable option to modify the selection of the given social group.

3. The method defined in claim 2 further comprising:
receiving a selection of the on-screen selectable option to modify the selection of the given social group;
in response to receiving the selection of the on-screen selectable option to modify the selection of the given social group, receiving a selection of a another social group; and
in response to receiving the selection of the other social group, automatically transmitting the content over the communications network to the client devices associated with the users in the other social group.

4. The method defined in claim 1 further comprising:
receiving a selection of the on-screen selectable option to transmit the content over the communications network to the client devices associated with the users in the given social group; and
in response to receiving the selection of the on-screen selectable option to transmit the content over the communications network to the client devices associated with the users in the given social group, transmitting the content over the communications network to the client devices associated with the users in the given social group.

5. The method defined in claim 4 wherein transmitting the content over the communications network to the client devices associated with the users in the given social group comprises transmitting the content to a service portal and transmitting the content from the service portal to the client devices associated with the users in the given social group selected.

6. The method defined in claim 1 further comprising:
while automatically displaying the on-screen selectable option to transmit the content to the client devices, automatically displaying an on-screen selectable option to not transmit the content over the communications network to the client devices.

7. A method of using a cellular telephone with an integrated camera to distribute content to client devices of users over a communications network, the method comprising:
receiving with an input from a user of the cellular telephone indicating a selection of a given social group;
while the mobile client is operating in a semi-automatic content sharing mode, capturing the content using the integrated camera; and
while the mobile client is operating in the semi-automatic content sharing mode and in response to capturing the content using the integrated camera, automatically prompting the user of the cellular telephone to determine whether or not the content is to be shared.

8. The method defined in claim 7 wherein automatically prompting the user of the cellular telephone to determine whether or not the content is to be shared comprises displaying a prompt to confirm that the content is to be shared.

9. The method defined in claim 7 wherein automatically prompting the user of the cellular telephone to determine whether or not the content is to be shared comprises displaying a prompt with an on-screen selectable option to share the content with a pre-selected list of other users.

10. The method defined in claim 9 wherein automatically prompting the user of the cellular telephone to determine whether or not the content is to be shared further comprising displaying a prompt with an on-screen selectable option to modify the pre-selected list of other users.

11. The method defined in claim 10 wherein automatically prompting the user of the cellular telephone to determine whether or not the content is to be shared further comprising displaying a prompt with an on-screen selectable option to not share the content.

\* \* \* \* \*